United States Patent Office 3,574,214
Patented Apr. 6, 1971

3,574,214
HYPOCHLORITE PROCESS FOR CHLOROURACILS
Earl W. Cummins, Wilmington, Del., assignor to E. I. du Pont de Nemours and Company, Wilmington, Del.
No Drawing. Filed Oct. 16, 1967, Ser. No. 675,324
Int. Cl. C07d 51/30
U.S. Cl. 260—260
7 Claims

ABSTRACT OF THE DISCLOSURE

A new process is described for making 5-chloro-3,6-disubstituted uracils by reacting an aqueous solution of an alkali metal salt of a 3,6-disubstituted uracil with aqueous sodium or potassium hypochlorite. After the hypochlorite chlorination has been completed, acid is added to produce crystals of the 5-chloro-3,6-disubstituted uracil. Subsequently the solid product is recovered by filtration or centrifugation and washed and dried.

BACKGROUND OF THE INVENTION

The uracils produced according to the process of this invention are useful as herbicides. Details regarding this activity will be found in U.S. Pat. 3,235,357.

U.S. Pat. 3,274,196 describes a process for making 5-chloro-3,6-disubstituted uracils by adding liquid or gaseous chlorine to an aqueous slurry of the appropriate 3,6-disubstituted uracil after it has been heated to a temperature between 60° and 110° C. The resulting reaction mass is then cooled and the 5-chloro-3,6-disubstituted uracil is recovered according to conventional methods.

Assignee's application Ser. No. 625,631, filed Mar. 24, 1967, now U.S. Pat. 3,480,631, describes a process for making 5-chloro-3,6-disubstituted uracil by chlorinating a 3,6-disubstituted uracil in an aprotic solvent with sulfuryl chloride.

The process of the subject invention has advantages over the above processes in that chlorination with hypochlorite is more selective and more economical than with either sulfuryl chloride or elemental chlorine. In addition, the subject reaction is run under basic conditions, thus eliminating problems which occur due to the acidic condition of these processes.

BRIEF SUMMARY OF THE INVENTION

This invention relates to novel processes for the selective chlorination of 3,6-disubstituted uracils to give 5-chloro-3,6-disubstituted uracils. More particularly, this invention relates to processes for the manufacture of such uracils by the chlorination of the alkali metal salts of 3,6-disubstituted uracils with aqueous sodium or potassium hypochlorite according to the following equation:

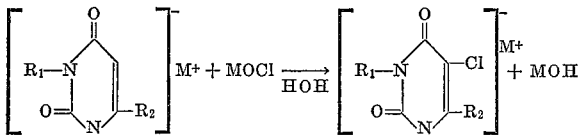

After this reaction step, the 5-chloro-3,6-disubstituted uracil product is liberated by adding acid and subsequently recovered by conventional techniques.

In the above equation:

$R_1$ is alkyl of 1 through 10 carbon atoms; alkyl of 1 through 8 carbon atoms substituted with bromine, chlorine, hydroxy, alkoxy, alkoxycarbonyl or cyano; aryl of 5 through 10 carbon atoms; phenyl substituted with chlorine, bromine, fluorine, alkoxy of 1 through 5 carbon atoms, alkyl of 1 through 6 carbon atoms, nitro, trifluoromethyl, 2,3-tetramethylene or 2,3-trimethylene; arylalkyl of 5 through 13 carbon atoms; arylalkyl substituted with chlorine, nitro, alkyl or alkoxy; cycloalkyl of 3 through 12 carbon atoms; cycloalkylalkyl of 4 through 13 carbon atoms or (substituted cycloalkyl)-alkyl of 5 through 14 carbon atoms wherein the substituent is selected from bromine, chlorine, methoxy or alkyl;

$R_2$ is hydrogen or alkyl of 1 through 3 carbon atoms, and

M is an alkali metal selected from the group consisting of sodium and potassium.

The term "aryl" includes radicals such as phenyl, naphthyl, pyridyl, tetrahydronaphthyl and indenyl. The term "arylalkyl" includes such radicals as furfuryl, benzyl, phenylalkyl and naphthylmethyl.

Preferred compounds in the above formula because of the high yield and ease of reaction are those compounds where $R_1$ is alkyl of 2 through 6 carbon atoms and $R_2$ is methyl. The process of the invention is most preferred for the production of 3-tert-butyl-5-chloro-6-methyluracil.

DETAILED DESCRIPTION OF THE INVENTION

The aqueous solution of the alkali metal salt of a 3,6-disubstituted uracil starting material for the process of the invention can be prepared by the reaction of a properly substituted urea with a β-keto ester in an aprotic solvent such as xylene to give a ureido intermediate; the ring is then closed under alkaline conditions to give a slurry of the salt of the corresponding 3,6-disubstituted uracil. Water is then added and the aqueous phase containing a desired alkali metal salt is removed.

The 3,6-disubstituted uracil salt starting material can also be prepared by reacting a properly substituted acetoacetamide with an alkyl carbamate in an aprotic solvent to give an intermediate crotonamide, which is then treated in the same manner as the ureido intermediate described above. These processes are set forth in greater detail in U.S. Patents 3,235,362 and 3,254,082, and Canadian Patent 727,624.

The term alkali metal salt as used throughout this application refers to the sodium and potassium salt. Of these salts, the use of the sodium salt is preferred.

The 3,6-disubstituted uracil alkali metal salt solutions prepared above contain a considerable amount of reaction by-products. In some instances it is advantageous with respect to yield and quality to use a purer alkali metal salt solution. Such a solution can be prepared easily by adding a mineral acid such as sulfuric to the two-phase system consisting of the aprotic solvent and the 3,6-disubstituted uracil alkali metal salt solution prepared above.

The addition of acid is continued until the pH of the resulting aqueous layer is between about 5.5 to 8. This addition results in the formation of the 3,6-disubstituted uracil which is now soluble in the aprotic solvent. In some instances it may be necessary to add additional aprotic solvent at this point, or prior to the addition of the acid, to effect complete solution of the 3,6-disubstituted uracil and to reduce the amount dissolved in the aqueous layer.

The lower aqueous layer containing large amounts of the reaction by-products is drawn off and fresh water is added to the upper phase. The pH of the new aqueous phase is adjusted to 13 to 13.7 with alkali, such as a 50% aqueous sodium or potassium hydroxide solution.

After agitation and settling, the resulting lower aqueous phase is drawn off. It contains essentially all of the 3,6-disubstituted uracil alkali metal salt that was present in the original solution, but in a much purer form.

The appropriate 3,6-disubstituted uracil can also be used in the process of this invention by simply dissolving it in an aqueous caustic solution.

In carrying out the process of the invention the aqueous alkali metal salt solution of the appropriate uracil is prepared at a concentration of 5 to 30% of the free uracil. A concentration of 10 to 25% is preferred because the higher concentrations tend to precipitate solids on standing and lower concentrations require larger equipment without any worthwhile process improvement. The concentration of uracil in the solution is controlled by the amount of water used in the process for preparing the alkali metal salt. Alternatively, a more concentrated solution can be made and diluted with water prior to use.

Aqueous alkali metal hypochlorite having a concentration of 5 to 16%, preferably 6 to 10%, is then added to the aqueous salt solution of the uracil. A 0 to 40% stoichiometric excess of the alkali metal hypochlorite is added to the solution, preferably a 5 to 35% excess. The preferred excess will vary with the temperature and the purity of the 3,6-disubstituted uracil alkali metal salt solution employed. At the lower temperatures a smaller excess can be used. The optimum excess for the pure solution of the 3,6-disubstituted uracil alkali metal salt, or a solution purified as set forth above, is 5 to 20%, preferably 10 to 15%, while for the unpurified solution prepared as set forth above it is 15 to 40%, preferably 20 to 35%.

The alkali metal hypochlorite is added to the mixture over a period of 5 to 180 minutes, preferably 5 to 30 minutes, while the temperature is maintained between −10 and 65° C., preferably at 0 to 55° C. by external cooling as necessary.

After the alkali metal hypochlorite addition is complete, the reaction mass is maintained at the reaction temperature for 0 to 60 minutes, preferably 5 to 15 minutes.

After the holding period, the reaction mass containing the alkali metal salt of the 3,6-disubstituted-5-chlorouracil is reacted with a mineral acid such as sulfuric to form the free 3,6-disubstituted-5-chlorouracil.

The acid addition step should be viewed as a two-stage process. In the first stage, the acid neutralizes the excess alkali metal hydroxide in the reaction mass and in the second stage, the chlorouracil is liberated from its alkali metal salt.

If a large particle size product is desired, seed crystals from a previous batch should be added after the first stage of the acid addition has been completed. This seeding aids in the formation of large crystals which are easier to handle in slurry form and are also easier to filter or centrifuge than are the smaller crystals that are obtained if seeding is not used.

The acid used in the first step is added to the reaction mass over a period of time such that the temperature of the reaction is maintained at 40 to 100° C., preferably 40 to 75° C. Generally the time of addition will be 15 to 30 minutes. The actual time is dependent upon the rate of heat transfer at the desired temperature. The acid addition is terminated at a pH at which no change in the pH will occur when the seed crystals are added. This pH will vary with the uracil being prepared and with its concentration.

For the preferred compound, 3-tert-butyl-5-chloro-6-methyluracil, at a concentration of 7.8% in the reaction mass after the chlorination, the pH at the end of the first stage of acid addition will be about 11. When seed crystals are added at this pH, they neither dissolve nor precipitate additional uracil from the reaction mass.

The seed crystals are added as a slurry and are taken from the previous batch. The seed crystals should be equal to about 2 to 10% of the amount of uracil in the reaction mass.

After the seeding operation is completed, the acid addition is resumed. This second step of acid addition should be carefully controlled in order to obtain large crystals and obtain other desired properties of the uracil product, e.g., crystalline form.

To obtain large crystals, the acid is added at a constant rate with good agitation during a period of 30 to 120 minutes. The temperature is maintained at 40° to 70° C. by external cooling. Some of the chlorouracil compounds undergo a crystalline transition at temperatures of 80° C. and above. The temperature during precipitation should preferably be held below the crystalline transition temperature to obtain the crystalline form which is stable at ambient temperature.

The acid addition is stopped when the pH of the reaction mass is between 5 and 8, preferably 6.5 to 7.5.

When the acid addition is complete, the solid reaction product is recovered. This can be accomplished by any suitable means such as filtration or centrifugation. The solid product thus separated is either then washed with water or repulped in water. The water used for washing or repulping should be preferably at a temperature of 30 to 80° C. The resulting residue is then dried by conventional means to give the 3,6-disubstituted-5-chlorouracil as an almost pure crystalline material.

In an alternate procedure, a solvent such as xylene, toluene or benzene can be added to the reaction mass after the chlorination reaction is complete and the reaction mass has been acidified. This will give a two-phase system consisting of an organic layer containing essentially all of the uracil product and an aqueous layer. The resulting mixture is then distilled to remove the organic solvent at 50° to 60° C., under vacuum, if necessary, while a dilute slurry of seed crystals is added to obtain the large particle size product. The resulting crystalline product can be isolated and dried as described above.

The invention will be more easily practiced and understood by referring to the following illustrative examples; all parts are by weight unless otherwise designated.

EXAMPLE 1

A slurry of 175 parts tert-butylurea, 168.5 parts of methyl acetoacetate, 304 parts xylene and 1 part of concentrated sulfuric acid is reacted as described in U.S. Pat. 3,254,082 to give a reaction mass containing 249 parts of methyl 3-(3-tert-butylureido)crotonate. A solution of 93 parts of sodium methylate in 340 parts of methanol is added to the above reaction mass; 366 parts of solvent in then removed by distillation and 535 parts of water is added to the residue; this procedure is also described in U.S. Pat. 3,254,082.

Four hundred parts of xylene recycle from a previous batch is added to the resulting two-phase system and the pH of the aqueous phase is adjusted to 7 by the addition of concentrated sulfuric acid with good agitation while the temperature is maintained at about 50° C. with external cooling as necessary. The layers are allowed to separate and the lower aqueous phase is drawn off and discarded.

Five hundred and thirty parts of water is added to the xylene layer and 117.5 parts of 50% aqueous sodium hydroxide is added to the stirred mixture during 15 minutes while the temperature is maintained at 50° C. by external cooling. The layers are allowed to separate. The lower aqueous layer (890 parts) is removed. It contains 24.4% of the sodium salt of 3-tert-butyl-6-methyluracil calculated as the free uracil.

The above solution is diluted with 780 parts of water and one thousand and three parts of a 10% solution of sodium hypochlorite (13.5% stoichiometric excess) is added during 5 minutes with good agitation. The initial temperature is 30° C. External cooling is employed throughout the addition so that the final temperature of the reaction mass is 45° C.

After a ten minute hold period the pH is adjusted to 11 by the addition of sulfuric acid to the agitated reaction mass while the temperature is maintained at 45° to 55° C. by external cooling. The resulting solution is then seeded with 10% of the final slurry from a previous batch. The pH of the resulting slurry is then adjusted to 7 with good agitation during 45 minutes while the temperature is maintained at 45° to 55° C. by external cooling.

The product is isolated by filtration after removing 10% of the slurry for seeding the next batch. It is then washed with 1000 parts of 35° C. water and dried in a vacuum oven at 70° C. to give 227 parts of 3-tert-butyl-5-chloro-6-methyluracil (70.5% of theoretical based on methylacetoacetate) having a purity greater than 97% by infrared analysis.

EXAMPLE 2

A 10% stoichiometric excess of a 10% sodium hypochlorite solution is added to a well agitated solution prepared from 11.5 parts of 3-tert-butyl-6-methyluracil, 5.58 parts of 50% aqueous sodium hydroxide and 82.9 parts of water during twenty minutes while the temperature is maintained between 25 and 35° C. by external cooling. The pH is adjusted to 6.5 by adding concentrated sulfuric acid to the well agitated solution while the temperature is maintained below 70° C. by external cooling.

The product is filtered, washed with 25 parts of water and dried to give 12 parts (87.5% of theoretical of 3-tert-butyl-5-chloro-6-methyluracil having a purity of about 97%. The purity is determined by a M.P.–I.R. correlation curve.

The above procedure can be followed using a 20% stoichiometric excess of sodium hypochlorite solution to obtain 11.3 parts (84% of theoretical) of 3-tert-butyl-5-chloro-6-methyluracil having a purity of about 99%.

The following 5-chloro-3,6-disubstituted uracils can be prepared from the corresponding unhalogenated uracils by chlorinating with sodium hypochlorite, using essentially the method of this example:

3-sec-butyl-5-chloro-6-methyluracil
3-isopropyl-5-chloro-6-methyluracil
3-cyclohexyl-5-chloro-6-methyluracil
3-n-pentyl-5-chloro-6-methyluracil
3-n-butyl-5-chloro-6-methyluracil
5-chloro-3-phenyl-6-methyluracil
5-chloro-3-(1-ethylpropyl)-6-methyluracil
5-chloro-3-(beta-phenethyl)-6-methyluracil
5-chloro-3-cyclohexylmethyl-6-methyluracil
5-chloro-3-(2,4-dimethylcyclohexyl)-6-methyluracil
5-chloro-3-(4-methoxycyclohexyl)-6-methyluracil
5-chloro-3-(2-chlorocyclohexyl)-6-methyluracil
5-chloro-6-ethyl-3-n-pentyl uracil
5-chloro-3-cyclooctyl-6-methyluracil
5-chloro-3-ethyl-6-methyluracil
5-chloro-3-(n-octyl)-6-methyluracil
3-sec-butyl-5-chloro-6-isopropyluracil

EXAMPLE 3

A solution of the sodium salt of 3-tert-butyl-6-methyluracil is prepared as in Example 1. Fifty parts of the solution is diluted with 41 parts of water and a 8% stoichiometric excess of a 10% sodium hypochlorite solution is added with stirring during 5 minutes while the temperature is maintained at 0° C. by external cooling. After an additional ten minutes the solution is heated to 40° C. and the pH adjusted to 6.5 with concentrated sulfuric acid while the temperature is maintained at 35 to 40° C. by external cooling.

The product is filtered, washed with 25 parts of water and dried to give 13.6 parts (93.6% of theoretical) of 3-tert-butyl-5-chloro-6-methyluracil having a purity of about 97%.

An equivalent quantity of 10% potassium hypochlorite can be used in place of the sodium hypochlorite with similar results.

EXAMPLE 4

A slurry of 175 parts tert-butylurea, 168.5 parts of methylacetoacetate, 304 parts xylene and 1 part of concentrated sulfuric acid are reacted as described in U.S. Pat. 3,254,082 to give a reaction mass containing 249 parts of methyl 3-(3-tert-butylureido)crotonate. A solution of 93 parts of sodium methylate in 340 parts of methanol is added to the above reaction mass; 366 parts of solvent is then removed by distillation and 535 parts of water is added to the residue; this procedure is also described in U.S. Pat. 3,254,082.

The aqueous layer is separated and diluted with an equal weight of water. One thousand one hundred and forty three parts of a 10% sodium hypochlorite solution (32% stoichiometric excess) is added over a period of 5 minutes with good agitation. The temperature increases from 28 to 50° C. during the addition. After an additional 15 minutes the pH is adjusted to 6.2 by the addition of concentrated sulfuric acid.

The product is filtered, washed with 1000 parts of 35° C. water and dried in a vacuum oven at 70° C. to give 215 parts (66.7% of theoretical based on methylacetoacetate) of 3-tert-butyl-5-chloro-6-methyluracil having a purity greater than 98%.

EXAMPLE 5

One hunderd parts of 3-benzyl-6-methyluracil is dissolved in a solution made up of 480 parts of water and 18 parts of sodium hydroxide. A 16.17% solution of sodium hypochlorite (233 parts) is added dropwise during a period of twenty minutes with good agitation and cooling.

The solution is diluted with 500 parts of water, and acidified with hydrochloric acid, the precipitate collected on a filter and washed thoroughly with water. The product is dried in vacuo. 112 parts of 3-benzyl-5-chloro-6-methyluracil (96% of theoretical) is obtained, M.P. 256-257° C.

EXAMPLE 6

3-(o-fluorobenzyl)-6-methyluracil (12.5 parts) is dissolved in a solution made up of 50 parts of water and 2.5 parts of sodium hydroxide. Twenty-seven parts of a 16.17% solution of sodium hypochlorite is added dropwise with stirring and cooling in an ice-water bath. The solution is allowed to stir for an additional 10 minutes. It is then diluted with 100 parts of water and acidified with hydrochloric acid. The precipitate is collected on a filter and washed thoroughly with water.

The product is dried in vacuo. 13.5 parts of 5-chloro-3-(o-fluorobenzyl)-6-methyluracil (94% of theoretical) is obtained, M.P. 230–231° C.

EXAMPLE 7

Ten parts of technical 3-furfuryl-6-methyluracil is dissolved in a solution made up of 50 parts of water and 2 parts of sodium hydroxide. The solution is cooled in an ice-water bath. Twenty-five parts of a solution containing 161.7 parts of sodium hypochlorite per 1000 parts of solution is added dropwise over a period of about 5 minutes. The solution is allowed to stir for another 10 minutes, diluted with water, and acidified with hydrochloric acid.

The aqueous layer is decanted from the oily product which is dissolved in methylene chloride and extracted with 5% sodium hydroxide solution. The basic solution is acidified with hydrochloric acid and the precipitate collected and recrystallized from a butanol-hexane mixture. 1.5 parts of 5-chloro-3-furfuryl-6-methyluracil is collected, M.P. 193–196° C.

What is claimed is:

1. A process for the preparation of 5-chloro-3,6-disubstituted uracils comprising reacting an aqueous solution of the sodium or potassium salt of a 3,6-disubstituted uracil with a 0 to 40% stoichiometric excess of an aqueous solution of sodium or potassium hypochlorite at a temperature between —10° and 65° C. and recovering the 5-chloro-3,6-disubstituted uracil from the aqueous reaction medium.

2. A process for the preparation of 3-tert-butyl-5-chloro-6-methyluracil comprising reacting for a period of 5 to 180 minutes a 5 to 30% aqueous solution of the sodium salt of 3-tert-butyl-6-methyluracil, based on the free uracil, with a 0 to 40% stoichiometric excess of a 5 to 16% aqueous solution of sodium hypochlorite at a temperature between —10° and 65° C., holding the reaction mass at a temperature of —10° to 65° C. for a period of 0 to 60 minutes, and recovering said chlorinated uracil from the reaction medium.

3. A process for the preparation of 5-chloro-3,6-disubstituted uracils comprising the steps of:
   (A) preparing a 10 to 25% aqueous solution, based on the free uracil, of the sodium or potassium salt of a 3,6-disubstituted uracil;
   (B) adding to said solution a 5 to 35% stoichiometric excess of a 6 to 10% aqueous solution of sodium hypochlorite or potassium hypochlorite, the addition being made over a period of 5 to 30 minutes while maintaining the temperature of the reaction mass at 0 to 55°C.;
   (C) holding the reaction mass at a temperature of 0 to 55°C. for a period of 5 to 15 minutes; and,
   (D) recovering the 5-chloro-3,6-disubstituted uracil from the reaction medium.

4. A process for the preparation of 3-tert-butyl-5-chloro-6-methyluracil comprising the steps of:
   (A) preparing a 10 to 25% aqueous solution, based on the free uracil, of the sodium salt of 3-tert-butyl 6-methyluracil;
   (B) adding to said solution a 5 to 35% stoichiometric excess of a 6 to 10% aqueous solution of sodium hypochlorite, the addition being made over a period of 5 to 30 minutes while maintaining the temperature of the reaction mass at 0 to 55°C.;
   (C) holding the reaction mass at a temperature of 0 to 55°C. for a period of 5 to 15 minutes; and
   (D) recovering the 3-tert-butyl-5-chloro-6-methyluracil from the reaction medium.

5. The process of claim 3 wherein the 5-chloro-3,6-disubstituted uracil is recovered by the following steps:
   (A) adding mineral acid to the reaction medium to obtain a pH of about 11 while the the temperature is maintained at 40 to 100°C.;
   (B) adding 2 to 10%, based on uracil present in the reaction medium, of seed crystals of said 5-chloro-3,6-disubstituted uracil; and
   (C) adding additional mineral acid to the reaction medium until the pH is between 5 and 8 while maintaining the temperature at 40° to 70°C.; and
   (D) separating the solid uracil product, washing and drying.

6. The process of claim 4 wherein the 3-tert-butyl-5-chloro-6-methyluracil is recovered by the following steps:
   (A) adding mineral acid to the reaction medium to obtain a pH of about 11 while the temperature is maintained at 40° to 100°C.;
   (B) adding 2 to 10%, based on the uracil present in the reaction medium, of seed crystals of said 3-tert-butyl-5-chloro-6-methyluracil;
   (C) adding additional mineral acid to the reaction medium until the pH is between 5 and 8 while maintaining the temperature at 40° to 70°C.; and
   (D) separating the solid uracil product, washing and drying.

7. The process of claim 1 where the 5-chloro-3,6-disubstituted uracil is a compound of the formula:

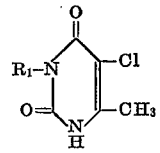

wherein $R_1$ is alkyl of 2 through 6 carbon atoms.

References Cited
UNITED STATES PATENTS
3,274,196  9/1966  Thompson _____ 260—260

ALEX MAZEL, Primary Examiner
A. M. T. TIGHE, Assistant Examiner

U.S. Cl. X.R.
71—92